US012573941B2

(12) United States Patent
Nagaraj et al.

(10) Patent No.: US 12,573,941 B2
(45) Date of Patent: Mar. 10, 2026

(54) BRIDGE CONVERTER CONTROL

(71) Applicant: VOLVO TRUCK CORPORATION, Gothenburg (SE)

(72) Inventors: Chandrasekhar Nagaraj, Gothenburg (SE); Jonas Ottosson, Gothenburg (SE); Svante Möller, Alingsås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 292 days.

(21) Appl. No.: 18/524,752

(22) Filed: Nov. 30, 2023

(65) Prior Publication Data

US 2024/0195284 A1 Jun. 13, 2024

(30) Foreign Application Priority Data

Dec. 12, 2022 (EP) ..................................... 22212902

(51) Int. Cl.
*H02M 1/08* (2006.01)
*H02M 1/00* (2006.01)
(Continued)

(52) U.S. Cl.
CPC ......... *H02M 1/088* (2013.01); *H02M 1/0025* (2021.05); *H02M 3/157* (2013.01); *H02M 3/158* (2013.01)

(58) Field of Classification Search
CPC .... H02M 1/088; H02M 1/0025; H02M 3/157; H02M 3/158; H02M 1/082; H02M 1/0012
See application file for complete search history.

(56) References Cited

U.S. PATENT DOCUMENTS

2006/0015274 A1   1/2006   Trandafir et al.
2009/0102446 A1   4/2009   Takahashi et al.
(Continued)

FOREIGN PATENT DOCUMENTS

CN        114726202 A      7/2022
DE     102017122785 A1     4/2018

OTHER PUBLICATIONS

Extended European Search Report in corresponding European Application No. 22212902.5 dated May 15, 2023 (8 pages).
(Continued)

*Primary Examiner* — Muhammad S Islam
(74) *Attorney, Agent, or Firm* — Jeffri A. Kaminski; Venable LLP

(57) ABSTRACT

A computer system comprising a processor device configured to switch between switching modes of a load is presented. The switching modes are a complementary switching mode and a non-complementary switching mode of an upper switch and a lower switch of a first half-bridge converter configured to provide a wanted power to a load. The processor device is configured to provide a first upper control signal to the upper switch and a first lower control signal to the lower switch as center aligned PWM-signals at a first PWM period. Responsive to determining that a current switching mode is to be changed at a second PWM period, the processor device is further configured to determine a time-shift for shifting the first upper control signal and the first lower control signal, and to provide the first upper control signal shifted by the time-shift to the upper switch and the first lower control signal shifted by the time-shift to the lower switch at the second PWM period.

20 Claims, 6 Drawing Sheets

(51) Int. Cl.
    *H02M 1/088*       (2006.01)
    *H02M 3/157*       (2006.01)
    *H02M 3/158*       (2006.01)

(56)             References Cited

U.S. PATENT DOCUMENTS

2015/0138844 A1*   5/2015   Karlsson ........... H02M 3/33546
                                      363/21.1
2016/0126946 A1     5/2016   Joos et al.

OTHER PUBLICATIONS

Kim, H.-J.; Park, H.-S.; Kim, J.-M. Expansion of Operating Speed
Range of High-Speed BLDC Motor Using Hybrid PWM Switching
Method Considering Dead Time. Energies 2020, 13, 5212, 13 pages.

\* cited by examiner

Fig. 1a
Fig. 1b
Fig. 2
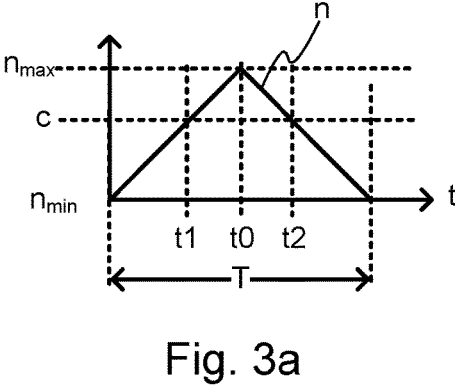
Fig. 3a
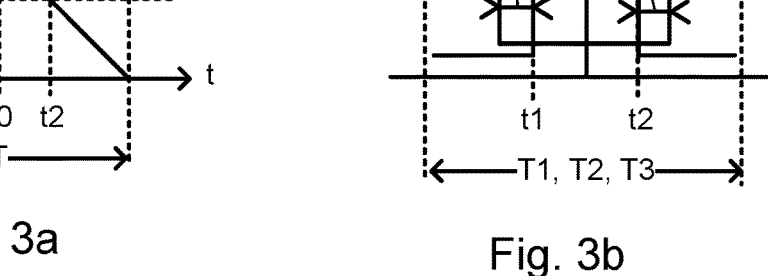
Fig. 3b

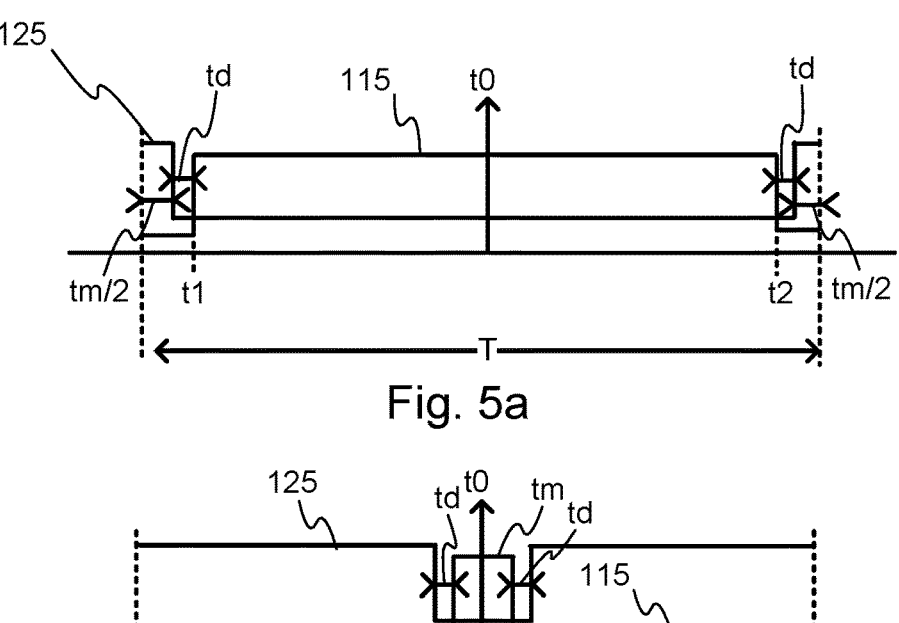
Fig. 5a
Fig. 5b
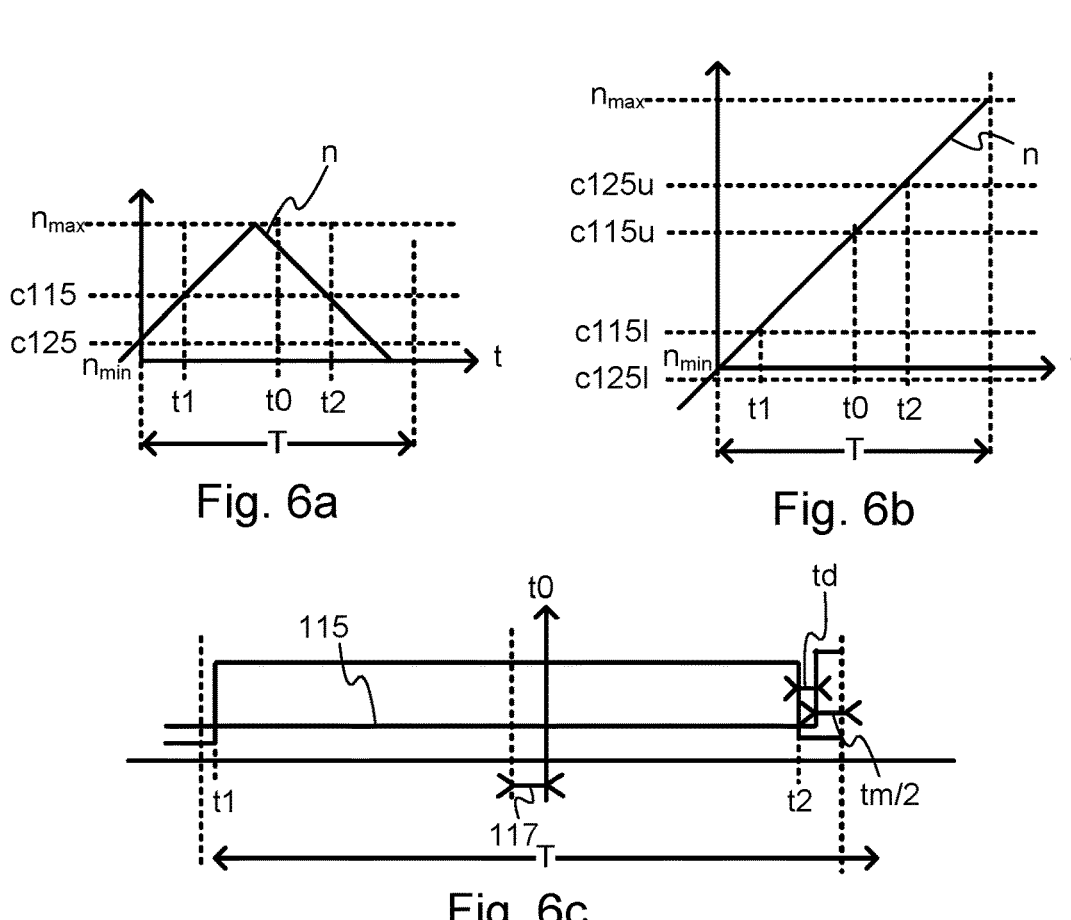
Fig. 6a
Fig. 6b
Fig. 6c

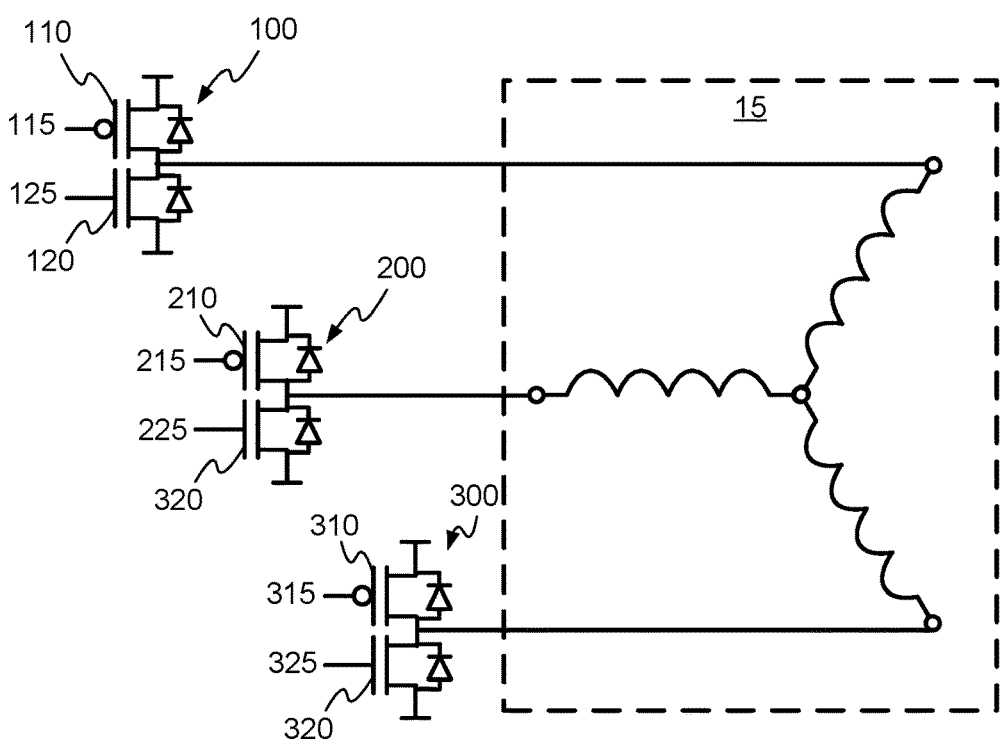
Fig. 8b
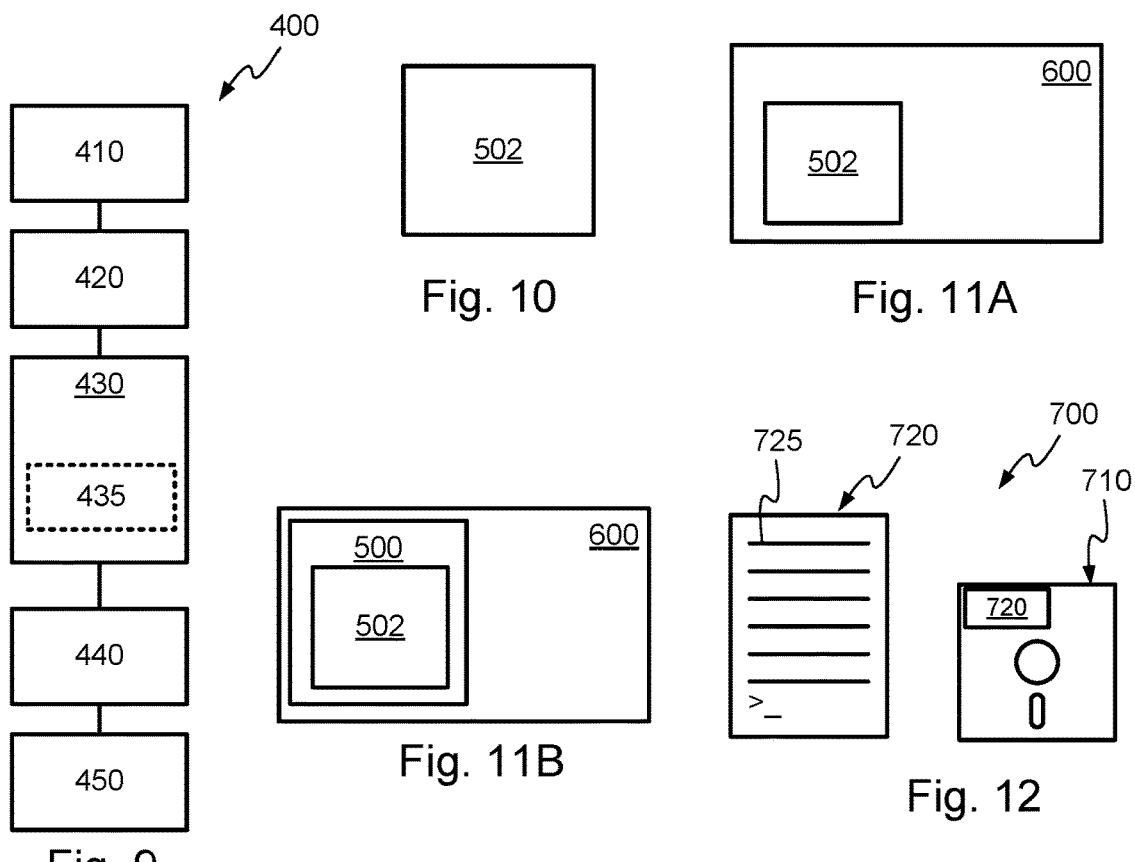
Fig. 9
Fig. 10
Fig. 11A
Fig. 11B
Fig. 12

BRIDGE CONVERTER CONTROL

TECHNICAL FIELD

The disclosure relates generally to control of a bridge converter. In particular aspects, the disclosure relates to control of a half-bridge converter in either a complementary switching mode and a non-complementary switching mode. The disclosure may be applied in heavy-duty vehicles, such as trucks, buses, and construction equipment. Although the disclosure may be described with respect to a particular vehicle, the disclosure is not restricted to any particular vehicle.

BACKGROUND

The utilization of half-bridge or full-bridge converters is commonplace in e.g. control of electrical motors. A bridge converter is generally controlled by pulse width modulation (PWM) of control signals in order to control an output current to a load. There are numerous different methods of performing PWM control and different methods may be employed at different wanted output currents.

As different methods are beneficial at different situations, some solutions change control methodology depending on situation. However, when changing between different control methodologies, there is a risk that constraints of the bridge converter and/or the load are violated.

SUMMARY

It is in view of the above considerations and others that the various embodiments of this disclosure have been made. The present disclosure therefor recognizes the fact that there is a need for alternatives to (e.g. improvement of) the existing art described above.

It is an object of some embodiments to solve, mitigate, alleviate, or eliminate at least some of the above or other disadvantages.

An object of the present disclosure is to provide a new type of control methodology of a bridge converter which is improved over prior art and which eliminates or at least mitigates the drawbacks discussed above. More specifically, an object of the invention is to provide a method for control of a half-bridge converter may switch between a complementary switching mode and a non-complementary switching mode with reduced risk of violating constraints of a load or the half-bridge converter. These objects are achieved by the technique set forth in the appended independent claims with preferred embodiments defined in the dependent claims related thereto.

According to a first aspect of the disclosure, a computer system comprising a processor device configured to switch between switching modes of a load is presented. The switching modes are a complementary switching mode and a non-complementary switching mode of an upper switch and a lower switch of a first half-bridge converter configured to provide a wanted power to a load. The processor device is configured to provide a first upper control signal to the upper switch and a first lower control signal to the lower switch as center aligned PWM-signals at a first PWM period. Responsive to determining that a current switching mode is to be changed at a second PWM period, the processor device is further configured to determine a time-shift for shifting the first upper control signal and the first lower control signal, and to provide the first upper control signal shifted by the time-shift to the upper switch and the first lower control signal shifted by the time-shift to the lower switch at the second PWM period.

In some examples, the processor device is further configured to provide the first upper control signal to the upper switch and the first lower control signal to the lower switch as center aligned PWM-signals at a third PWM period following directly after the second PWM period. This is beneficial as this reverts back to the known and classic control.

In some examples, the switching mode of the first period is the non-complementary switching mode.

In some examples, the time-shift is determined based on a dead-time constraint of the first half-bridge converter. This is beneficial as it ensures that dead-time constraints are fulfilled.

In some examples, the time-shift is determined based on minimum pulse-width constraint of the first half-bridge converter. This is beneficial as it ensures that minimum pulse-width constraints are fulfilled.

In some examples, the time-shift is determined based on the wanted power of the load. This is beneficial as it ensures that wanted power requirements/constraints are fulfilled.

In some examples, the processor device is further configured to determine the time shift by, responsive to determining that a dead-time constraint and a minimum pulse—with constraint will be fulfilled by providing center aligned PWM-signals to the upper switch and the lower switch, setting the time-shift to zero. This is beneficial as the operation of time-shifting may be omitted completely, reducing processor workload and saving power.

In some examples, the load is an inductive load in the form of a three-phase motor, the first half-bridge converter is configured to provide power at a first phase of the three-phase motor and wherein the method is repeated for a second half-bridge converter being configured to provide power at a second phase of the three-phase motor and for a third half-bridge converter being configured to provide power at a third phase of the three-phase motor.

According to a second aspect of the disclosure, a computer-implemented method for switching between switching modes of a load is presented. The switching modes being a complementary switching mode and a non-complementary switching mode of an upper switch and a lower switch of a first half-bridge converter configured to provide a wanted power to a load. The method comprises providing, by a processor device of a computer system, a first upper control signal to the first upper switch and a first lower control signal to the first lower switch as center aligned PWM-signals at a first PWM period. The method further comprises, responsive to determining, by the processor device that a current switching mode is to be changed at a second PWM period, determining, by the processor device a time-shift for shifting the first upper control signal and the first lower control switch; and further providing, by the processor device the first upper control signal shifted by the time-shift to the first upper switch and the first lower control signal shifted by the time-shift to the first lower switch at the second PWM period.

In some examples, the computer-implemented method further comprises providing, by the processor device the first upper control signal to the upper switch and the first lower control signal to the lower switch as center aligned PWM-signals at a third PWM period following directly after the second PWM period. This is beneficial as this reverts back to the known and classic control.

In some examples, the switching mode of the first period is the non-complementary switching mode.

In some examples, the time-shift is determined based on a dead-time constraint of the first half-bridge converter. This is beneficial as it ensures that dead-time constraints are fulfilled.

In some examples, the time-shift is determined based on minimum pulse-width constraint of the first half-bridge converter. This is beneficial as it ensures that minimum pulse-width constraints are fulfilled.

In some examples, the time-shift is determined based on the wanted power of the load. This is beneficial as it ensures that wanted power requirements/constraints are fulfilled.

In some examples, determining the time shift further comprises, responsive to determining, by the processor device, that a dead-time constraint and a minimum pulse—with constraint will be fulfilled by providing center aligned PWM-signals to the upper switch and the lower switch, setting the time-shift to zero. This is beneficial as the operation of time-shifting may be omitted completely, reducing processor workload and saving power.

In some examples, the load is an inductive load.

In some examples, the load is a three-phase motor, the first half-bridge converter is configured to provide power at a first phase of the three-phase motor and wherein the method is repeated for a second half-bridge converter being configured to provide power at a second phase of the three-phase motor and for a third half-bridge converter being configured to provide power at a third phase of the three-phase motor.

In a third aspect, vehicle comprising the computer system according to the first aspect is presented.

In a fourth aspect, a computer program product comprising program code for performing, when executed by the processing circuitry, the method of the second aspect is presented.

In a fifth aspect, a non-transitory computer-readable storage medium is presented. The non-transitory computer-readable storage medium comprises instructions, which when executed by a processor device cause the processor device to perform the method of the second aspect.

In a sixth aspect, a vehicle is presented. The vehicle comprises a processor device configured to perform the method of the second aspect.

In a seventh aspect, a control system is presented. The control system comprises one or more control units configured to perform the method of the second aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 1a is an exemplary half-bridge converter according to one example.

FIG. 1b is an exemplary full bridge converter according to one example.

FIG. 2 is an exemplary timing diagram according to one example.

FIG. 3a is an exemplary control diagram according to one example.

FIG. 3b is an exemplary timing diagram according to one example.

FIG. 5a is an exemplary timing diagram according to one example.

FIG. 5b is an exemplary timing diagram according to one example.

FIG. 6a is an exemplary control diagram according to one example.

FIG. 6b is an exemplary control diagram according to one example.

FIG. 6c is an exemplary timing diagram according to one example.

FIG. 8b are an exemplary half-bridge converters coupled to a load according to one example.

FIG. 9 is a block diagram of a method for switching between switching modes of a load according to one example.

FIG. 10 is a block diagram of a processor device according to one example.

FIG. 11A is a block diagram of a vehicle according to one example.

FIG. 11B is a block diagram of a vehicle according to one example.

FIG. 12 is a block diagram of a computer program product according to one example.

DETAILED DESCRIPTION

Figure 3C:
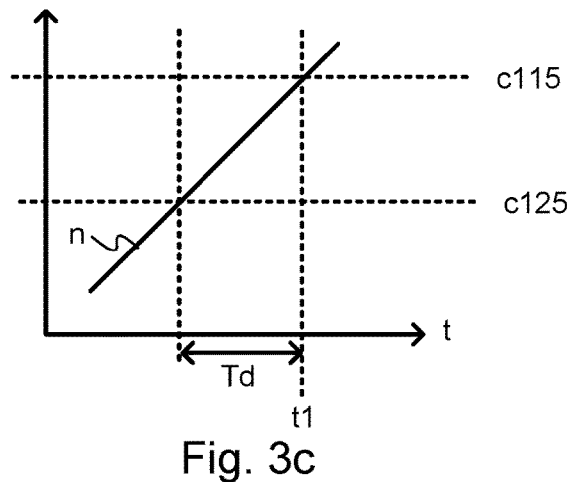
FIG. 3c is an exemplary control diagram according to one example.

Aspects set forth below represent the necessary information to enable those skilled in the art to practice the disclosure.

FIG. 1a is an exemplary first half-bridge converter 100 according to one example. The first half-bridge converter 100 in FIG. 1a is configured to provide a current i to a load 10. The load 10 is connected between an output of an upper switch 110 and a lower switch 120 of the half-bridge converter 100. A state (e.g. actively conducting or not) of the upper switch 110 is controllable by a first upper control signal 115 and a state (e.g. actively conducting or not) of the lower switch 120 is controllable by a first lower control signal 125.

In FIG. 1b, the load 10 is arranged between the first half-bridge converter 100 and a second half-bridge converter 200. The second half-bridge converter 200 may be corresponding, identical or different from the first half-bridge converter 100. The second half-bridge converter 200 comprises an upper switch 210 and a lower switch 220 correspondingly to the first half-bridge converter 100. A state (e.g. actively conducting or not) of the upper switch 210 of the second half-bridge converter 200 is controllable by a second upper control signal 215 and a state (e.g. actively conducting or not) of the lower switch 120 of the second half-bridge converter 200 is controllable by a second lower control signal 225.

It should be mentioned that, in order to simplify explanation and control, a control signal 115, 125, 215, 225 indicated as active, e.g., enabled, high, '1' etc., is to mean a control signal 115, 125, 215, 225 that places the associated switch 110, 120, 210, 220 in an actively conducting state, i.e. a low resistance state. Correspondingly, a control signal 115, 125, 215, 225 indicated as inactive, e.g., disabled, low, '0', etc., is to mean a control signal 115, 125, 215, 225 that places the associated switch 110, 120, 210, 220 in a non-conducting state, i.e. a high resistance state. Conducting in this context is to mean conducting at a low impedance state, i.e. where an impedance of the switch 110, 120, 210, 220 is controlled by an on-resistance of the switch 110, 120, 210, 220. This is regardless if the associated switch is illustrated as a P- or N-switch. Further, when diodes of the switches 110, 120, 210, 220 are conducting, this will generally be referenced as the associated switch 110, 120, 210, 220 is conducting in a reverse direction, that the diode is conducting etc., and the current referenced as a reverse current. In addition to this, generally, the load 10 is an inductive load, preferably an electrical motor, unless otherwise specified.

For the present disclosure, a forward current through a semiconductor switch may be controlled at either a linear region or a saturated region. At the linear region, a current through the switch will increase with a voltage (or current depending on switch topology) applied to the control (i.e. a base or a gate) of the switch. At the linear region, the on-resistance will decrease with increased control voltage until the switch enters the saturated region. At the saturated region, the switch is fully open and further increase of the control voltage will not be reflected by an increased forward current through the switch. In order to reduce conduction losses, it is advantageous to control the switch at the saturated region and a time spent at the linear region is advantageously kept as short as possible. The on-resistance may be e.g. a drain-source resistance if the switches are implemented as field effect transistors (FET) (as indicated in FIG. 1*a*) or a collector-emitter resistance if the switches are implemented as bipolar junction transistors (BJT) or insulated gate bipolar transistors (IGBT).

With reference to FIG. 1*b*, a brief introduction to the control of the current i through the load 10 will be given. As the current i is illustrated in FIG. 1*b*, a positive current will be supplied through the load 10 by controlling the first upper control signal 115 such that the upper switch 110 of the first half-bridge converter 100 is conducting. In order to provide a path for the current i through the load 10 and to a lower potential (signal ground), the second lower control signal 225 is controlled such that the lower switch 220 of the second half-bridge converter 100 is conducting. In FIG. 1*b*, this will provide a path for the current i from an upper left corner to a lower right corner. This state is kept for a first time-period, after which the first upper control signal 115 is configured such that the upper switch 110 of the first half-bridge converter 100 is disabled (not conducting in a forward direction). As the load is inductive, when the upper switch 110 of the first half-bridge converter is disabled, the current i will want to continue to flow in the indicated direction through the load 10. In order to enable this, the second upper control signal 215 is configured such that the upper switch 210 of the second half-bridge converter 100 is conducting. In this state, none of the switches 110, 120 of the first half-bridge converter 100 are conducting and the current i will flow through the diode of the lower switch 120 of the first half-bridge converter 100, through the load 10, through the upper switch 210 of the second half-bridge converter 100 and back to a power source. This control mode is generally referred to as a non-complementary switching mode. Alternatively, the first lower control signal 125 may be configured such that the lower switch 120 of the first half-bridge converter 100 is conducting. This may be done in order to e.g. decrease a power dissipation of the lower switch 120 of the first half-bridge converter 100 as a voltage drop across the diode is generally larger than a voltage drop across the on-resistance of the switch 110, 120, 210, 220. The latter control mode is generally referred to as a complementary switching mode as the upper and lower switches 110, 120, 210, 220 of the half-bridge converter 100, 200 work in complement, i.e. for one respective half-bridge converter 100, 200, when one upper switch 110, 210 is enabled, the lower switch 120, 220 is disabled and when one upper switch 110, 210 is disabled, the lower switch 120, 220 is enabled.

Complementary switching is generally the most energy efficient and preferred method of control. However, each time a switch changes state, it will pass through a linear region at which, as previously indicated, the on-resistance of the switch is increasing from its minimum value (ideally zero) to its maximum value (ideally infinity). In the active region, the switch will dissipate power and switching losses are at a maximum. Therefore, it is beneficial to change state of a switch as seldom as possible. Further to this, each time a switch is about to change state, it will take a certain time before e.g. a gate of the switch is charged (or discharged) and the switch start to change states. Therefore, a time during which a switch is active is preferably considerably longer than a time it takes for the switch to change state. As the skilled person understands, the design of the switch will affect the slew-rate and the on-resistance, but regardless, these limitations will put constraints on the method used to control a switch.

In complementary switching, it is important to ensure that only one of the switches 110, 120, 210, 220 of a respective half-bridge converter 100, 200 is active at the same time. If both switches 110, 120, 210, 220 of a respective half-bridge converter 100, 200 were active at the same time, a path from the high potential to the low potential would be provided through the switches 110, 120, 210, 220 effectively short-circuiting the half-bridge converter 100, 200. Also if both switches 110, 120, 210, 220 of a respective half-bridge converter 100, 200 are in their respective linear regions, there will be a path from the high potential to the low potential bypassing the load 10. In order to reduce a risk of this happening, a guard interval is generally introduced between changing state of the switches 110, 120, 210, 220 of a respective half-bridge converter 100, 200. A minimum allowable guard interval is commonly known as a dead-time constraint td or dead-time td for short (see FIG. 2).

In switching applications, in order to maximize a power output to the load 10, it may be advantageous to maximize an average voltage available across the load 10. A maximum voltage available across the load 10 is a supply voltage of the half-bridge converters 100, 200, i.e. a difference an upper supply voltage V+ and a lower supply voltage V− of the half-bridge converter 100, 200. The maximum voltage is assuming no losses and no switching (100% duty cycle). Generally, for a specific power output, it is advantageous to increase a voltage across the load 10 rather than a current through the load, as the losses are proportional to the current squared. Therefore, it may be advantageous to maximize how much of a source voltage will be available across the load 10 by maximizing a duty cycle of the upper control signals 115, 125. However, the maximum duty cycle will be limited by the dead-time constraint td. Consequently, switching to non-complementary switching at high duty cycles will allow higher duty cycles and therefore a higher voltage across the load 10.

In FIG. 2, an exemplary timing diagram of pulse width modulation (PWM) control of the first half-bridge converter 100 is illustrated. As seen, both the first upper control signal 115 and the first lower control signal 125 change states which indicates that the timing diagram is illustrative of a complementary switching mode. As seen in FIG. 2, the dead-time td is introduced between a point in time when the first upper control signal 115 goes low and a next point in time when the first lower control signal 125 goes high. Correspondingly, a dead-time td is introduced between a point in time when the first lower control signal 125 goes low and a next point in time when the first upper control signal 115 goes high. In FIG. 2, the same dead-time td is introduced at both edges of the control signals 115, 125 and this is the preferred way. However, in some examples, the dead-time td introduced prior to activating the first upper control signal 115 may be different from the dead-time td introduced prior to activating the first lower control signal 125. The reason for such a configuration may be e.g. differences in drivers for the upper and lower switches 110, 120, differences in slew rate between the upper and lower switches 110, 120, etc.

As seen in FIG. 2, a first PWM period T1 is indicated as a time period centered at the a middle point between the first upper control signal 115 going high for the first time and the first upper control signal 115 going low for the first time. An end of the first PWM period T1 is indicated as a middle point t0 between the first upper control signal 115 going low for the first time and the first upper control signal 115 going high for the second time. A second PWM period T2 and a third PWM period T3 are indicated correspondingly. The duration of the PWM periods T1, T2, T3 are typically the same. As seen in FIG. 2, a middle point t0 of each PWM period T1, T2, T3 is characterized by being aligned with a center of a high portion of the first upper control signal 115. This is generally referred to as center-aligned PWM control which will be briefly discussed in the coming section.

In FIG. 3a, an exemplary control diagram for center-aligned PWM is shown. Center-aligned PWM is a commonly known PWM control and will only be briefly explained. Center-aligned PWM generally operate by a counter n being increased by one value each clock period from a minimum counter value $n_{min}$ until the counter n reaches a maximum counter value $n_{max}$. When the counter n reaches the maximum counter value $n_{max}$, the counter n is decreased by one value each clock period from the maximum counter value $n_{max}$ until the counter n reaches the minimum counter value $n_{min}$ once more. The PWM is controlled by defining a control value c, and when the counter n reaches the control value c, an associated PWM signal is either activated (set to high, '1' etc.) or deactivated (set to low, '0' etc.) depending on if the counter n is increasing or decreasing, i.e. reaching the control value c from the minimum counter value $n_{min}$ or from the maximum counter value $n_{max}$. In FIG. 3a, a first time t1 is indicated as a point in time where the counter n reaches the control value c from below, i.e. when the counter n is increasing. A center time t0 is indicated as a point in time where the counter n reaches the maximum counter value $n_{max}$. A second time t2 is indicated as a point in time where the counter n reaches the control value c from above, i.e. when the counter n is decreasing. A period T of the PWM is defined as a time it takes for the counter n to cycle from the minimum counter value $n_{min}$ to the maximum counter value $n_{max}$ and back to the minimum counter value $n_{min}$ again.

Assuming that the first upper control signal 115 is activated at the first time t1 and deactivated at the second time t2, and that the complementary first lower control signal 125 is activated at the second time t2 and deactivated at the first time t1, control pulses as illustrated in FIG. 3b are provided. As seen in FIG. 3b, the first upper control signal 115 is active between the first time t1 and the second time t2 and the first lower control signal 125 is active between the second time t2 and the first time t1 of a consecutive period.

As seen in FIG. 3b the dead-time td is indicated between either edge of the first control signal 115 and the first lower control signal 125. The dead-time td may be provided by controlling the transitions of the first lower control signal 120 at a level that is offset (vertically lower in FIG. 3a) from the control value c. This is illustrated in FIG. 3c where a portion of the counter n is shown. A first control value c115 for controlling the transitions of the first upper control signal 115 is shown vertically above a second control value c125 for controlling the transitions of the first lower control signal 125. The number of steps between the first control value c115 and the second control value c125 together with period time of a clock for the counter n may determine the dead-time td.

Figure 3D:
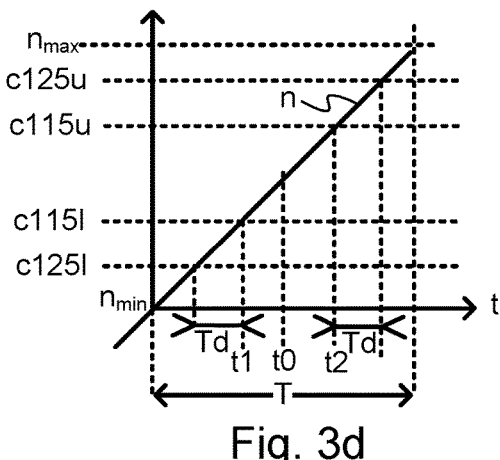
FIG. 3d is an exemplary control diagram according to one example.

In FIG. 3d, an alternative exemplary control diagram for center-aligned PWM is shown. As in FIG. 3a, the counter n is increased by one value each clock period from a minimum counter value $n_{min}$ until the counter n reaches the maximum counter value $n_{max}$. However, the counter n is increased from the minimum counter value $n_{min}$ to the maximum counter value $n_{max}$ during one PWM period T. In other words, the counter n is, in this example, strictly increasing. A corresponding scenario may very well be considered wherein the counter n is strictly decreasing. In the example of FIG. 3d, the first upper control signal 115 is controlled to change to an active state when the counter n reaches a lower first control value c115, and to an inactive state when the counter n reaches an upper first control value c115u. Correspondingly, if complementary switching is employed, the first lower control signal 125 is controlled to change to an inactive state when the counter n reaches a lower second control value c125l, and to an active state when the counter n reaches an upper second control value c125u. The upper control values c115u, c125u are greater than the lower control values c115l, c125l. The first lower control value c115l is greater than the second lower control value 125l and the first upper control value c115u is smaller than the second upper control value c125u. This ensures a dead-time td prior to a rising edge of the first upper control signal 115 that is determined by a difference between the first lower control value c115l and the second lower control value c125l. Correspondingly this ensures a dead-time td prior to a rising edge of the first lower control signal 125 that is determined by a difference between the second upper control value c125u and the first upper control value c115u. This allows the dead-time td prior to a rising edge of the first upper control signal 115 to be controlled independently of the dead-time td prior to a rising edge of the first lower control signal 125. In order for the control to be center-aligned, a respective difference between the lower control value c1151, c1251 and the minimum counter value $n_{min}$ should be the same as a respective difference between the maximum counter value $n_{max}$ and the corresponding upper control value c115u, c125u.

It should be mentioned that the control indicated in FIG. 2 and FIGS. 3a-d may very well be reversed such that the center time t0 is at a middle portion of an active section of the first lower control signal 125. For efficiency of disclosure, the present disclosure is made with center aligned control wherein the center time t0 is at a point in time where the upper control signal 115 is active. The skilled person will have no problem, after digesting the teachings herein, to adapt the control to implementations wherein the center time t0 is at a point in time where the lower control signal 125 is active.

Figure 4:
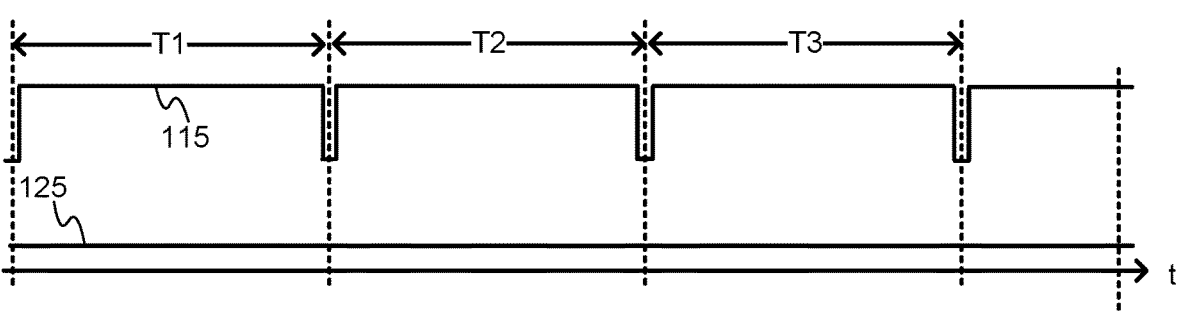
FIG. 4 is an exemplary timing diagram according to one example.

In FIG. 4, an exemplary timing diagram of (PWM) control the first half-bridge converter 100 is illustrated. As seen in FIG. 4, the second lower control signal 125 is never activated which means that the timing diagram shows an exemplary non-complementary switching.

As previously indicated, a selection of complementary switching (FIG. 2) or non-complementary switching (FIG. 4) may depend on a current duty cycle of the PWM. In the present disclosure, the duty cycle is defined as a time the upper switch 110, 120 is active (conducting) in relation to the PWM period time T. To exemplify with reference to FIG. 3b, the duty cycle is (t1–t2)/T. Due to dead-time constraints td and a minimum pulse-width tm (see FIG. 5b) for e.g. the lower switch 120, complementary switching may not be possible to utilize if the duty cycle is too high which means, as previously indicated, that the maximum voltage across the load 10 may be limited. For this reason, it may be beneficial to switch between complementary switching and non-complementary switching depending on the duty cycle.

To exemplify, due to dead-time constraints td and minimum pulse-width constraints tm, a maximum available voltage across the load 10 may be 90% of the supply voltage of the half-bridge converters 100, 200. When utilizing non-complementary switching, the dead-time constraint td need no longer be considered and only a minimum pulse-width constraints tm (the time the upper switch 110, 120 is off) may be considered. As a consequence, when utilizing non-complementary switching, the maximum available voltage across the load 10 may be 98% of the supply voltage of the half-bridge converters 100, 200.

When switching between complementary switching and non-complementary switching, there is a risk that requirements, constraints and/or regulations are violated. To exemplify, in FIG. 5a, a timing diagram is shown wherein the first upper control signal 115 has a maximum allowable duty cycle for complementary switching. The maximum duty cycle is determined based on at least the preciously introduced dead-time td and a minimum pulse-length tm, sometimes referred to as a minimum pulse-width constraint tm. The minimum pulse-length tm defines the shortest duration a pulse is allowed to be active (or inactive). The maximum duration the first upper control signal 115 may be active during complementary switching may be calculated by subtracting the minimum pulse-length tm and twice the dead-time td from the period time T. The maximum duty cycle may be described as (T-tm-2*td)/T. Correspondingly, as shown in FIG. 5b, a minimum duty cycle may be described as tm/T. Increasing the duty cycle above the maximum duty cycle will violate on or more constraints and the control has to be switched to non-complementary control.

If a first time period T1 is operating at complementary switching, and a following time period T2 is to operate at non-complementary switching, there is risk that the minimum pulse-length tm is violated at the start of the following time period T2. Correspondingly, if the first time period T1 is operated at non-complementary switching and the following time period T2 is to operate at complementary switching, there is a risk that the dead-time td and/or the minimum pulse-length tm is violated. The issue with violation of constraints is generally only present at a time period at which the control mode is switched between complementary switching and non-complementary switching.

The inventors behind the present disclosure have identified the risk of such issues at the first time period after a control mode has been changed and realized that this may be addressed by temporarily abandoning center aligning of PWM-signals. By time shifting the center aligned PWM-signals within a first PWM period T at which a different switching mode is used than in a previous PWM period, the issues discussed above may be reduced or preferably removed.

In FIG. 6a this is illustrated in a control diagram for center-aligned PWM wherein the counter n is shifted. E.g. the counter n is not started at the minimum counter value $n_{min}$, but at a higher value effectively shifting a point in time when the counter n reaches the maximum counter value $n_{max}$. If the starting value of the counter n is increased, the counter n will cross the second control value c125 earlier allowing greater margin at an end of the period T. Also, in this example, the shift is such that the counter n does not pass the second control value c125 as it increases, i.e. the starting value of the counter n is positively offset with a value greater than the second control value c125. The corresponding shift may be provided with a strictly increasing counter n. In such examples, the shift may be accomplished by reducing all the counter values c1151, c1251, c115u, c125u by an equal amount. This is illustrated in FIG. 6b. An exemplary timing diagram resulting from a shift as shown in FIG. 6a or FIG. 6b is shown in FIG. 6c. In FIG. 6c, the first upper control signal 115 and the first lower control signal 125 are both shifted by a time-shift 117 such that the first lower control signal 125 may operate at complementary switching at the end of the period T without risking a violation of dead time td and/or minimum pulse-length tm.

The example presented in reference to FIGS. 6a-e is advantageous when switching from non-complementary switching to complementary switching.

Figure 7A:
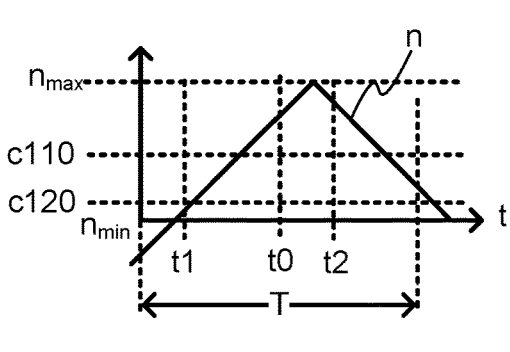
FIG. 7a is an exemplary control diagram according to one example.
Figure 7B:
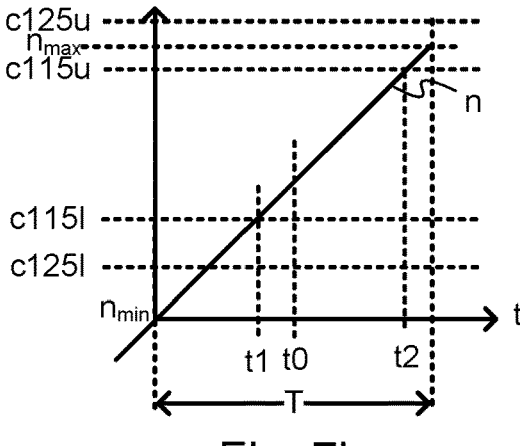
FIG. 7b is an exemplary control diagram according to one example.
Figure 7C:
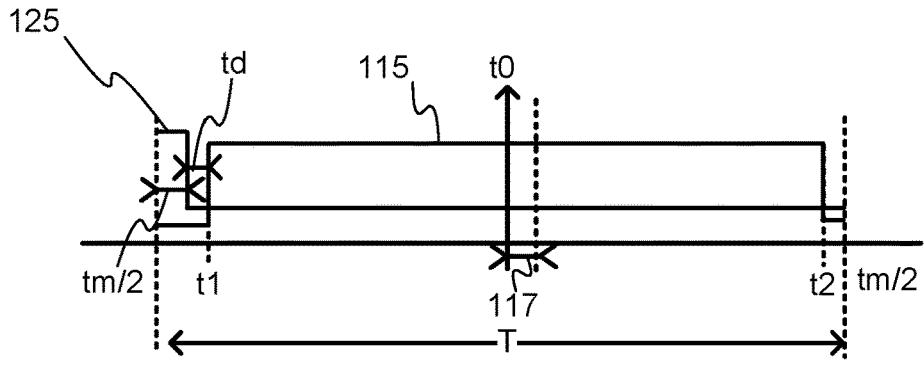
FIG. 7c is an exemplary timing diagram according to one example.

Correspondingly, in FIG. 7a this is illustrated in a control diagram for center-aligned PWM wherein the counter n is shifted in an opposite direction to that of FIG. 6a. E.g. the counter n is not started at the minimum counter value $n_{min}$, but at a lower value effectively shifting a point in time when the counter n reaches the maximum counter value $n_{max}$. If the starting value of the counter n is decreased, the counter n will cross the second control value c125 later allowing greater margin at a beginning of the period T. Also, in this example, the shift is such that the counter n does not pass the second control value c125 as it decreases, i.e. the starting value of the counter n is negatively offset with a value greater than the second control value c125. The corresponding shift may be provided with a strictly increasing counter n. In such examples, the shift may be accomplished by increasing all the counter values c1151, c1251, c115u, c125u by an equal amount. This is illustrated in FIG. 7b. An exemplary timing diagram resulting from a shift as shown in FIG. 7a or FIG. 7b is shown in FIG. 7c. In FIG. 7c the first upper control signal 115 and the first lower control signal 125 are both shifted by a time-shift 117 such that the first lower control signal 125 may operate at non-complementary switching at the end of the period T without risking a violation of dead time td and/or minimum pulse-length tm at the beginning of the time period T.

The example presented in reference to FIGS. 7a-b is advantageous when switching from complementary switching to non-complementary switching.

In the above examples, the time-shift 117 is determined based on the minimum pulse-length tm and the dead time td. It may be that only one of these constraints is at risk of violation. Consequently, in some embodiments, the only one of the minimum pulse-length tm to the dead time td is considered when determining the time-shift 117. Additionally, or alternatively, a power requirement of the load 10 may be considered, e.g. a wanted duty cycle may be considered when determining the time-shift 117. Further to this, in some embodiments, there may be situations where it a shift to/from non-complementary switching and complementary switching may be performed without risk of violating any constraints. In such embodiments, the time-shift 117 may set to zero, i.e. no time-shift is performed.

Figure 8A:
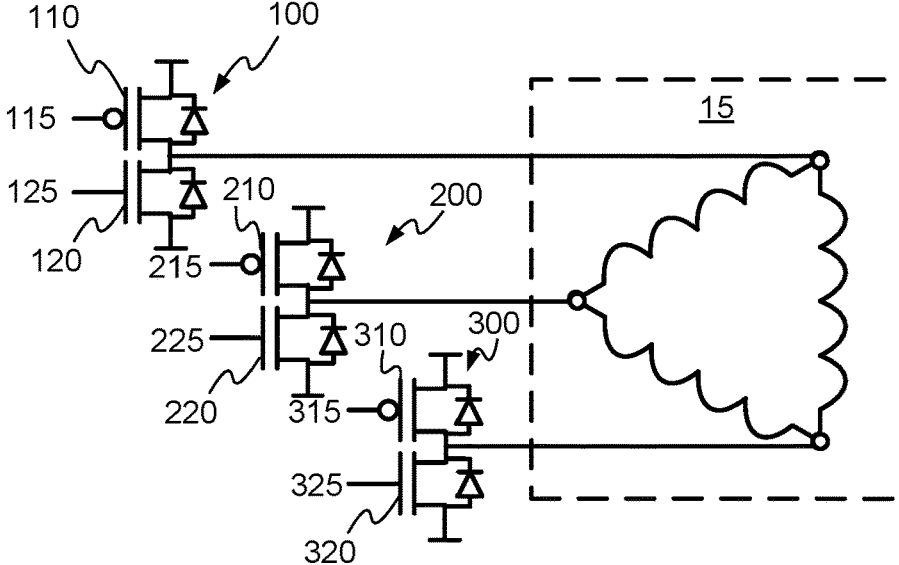
FIG. 8a are an exemplary half-bridge converters coupled to a load according to one example.

To exemplify, in FIGS. 8a-b three half-bridge converters 100, 200, 300 are shown controlling a load 10 in the form of a three phase motor 15. In FIG. 8a, the three phase motor is connected in a delta configuration, and in FIG. 8b, the three phase motor 15 is connected in a Y-configuration. Regardless of the configuration, each of the three half-bridge converters 100, 200, 300 may be the half-bridge converter 100 as presented herein, and the control of each half-bridge converter 100, 200, 300 may be according to any embodiment or example presented herein. As seen in FIGS. 8a-b, the half-bridge converters 100, 200, 300 are connected with each other through windings of the three phase motor 15.

Based on the teachings presented herein, a method 400 will be described with reference to FIG. 9. The method 400 is a method for switching between switching modes of the load 10. The method 400 may be a computer implemented method 400. As taught herein, the method 400 is advantageously applied when switching to and from complementary and non-complementary switching. The method 400 may be performed on any half-bridge converter 100, 200, 300 presented herein. The method 400 may be implemented by means of a processor device 502 (see FIG. 10) of a computer system 500 (see FIG. 13). That is to say, the method 400 may be performed by, performed with the assistance of, or caused by the processor device 502. It should be mentioned that the method 400 may be extended, modified, reduced etc. to in accordance with any example, embodiment or teaching presented herein.

The method 400 comprises providing 410 the first upper control signal 115 to the first upper switch 110 and a first lower control signal 125 to the first lower switch 120 as center aligned PWM-signals at a first PWM period T1.

The method 400 further comprises determining 420 if a switching mode is to be changed for a next PWM period, e.g. the second PWM period T2. The change in switching mode may be determined based on the duty cycle crossing a duty cycle threshold. That is to say, of the duty cycle as defined herein is above the duty cycle threshold, non-complementary switching may be employed and if the duty cycle is below the duty cycle threshold, complementary switching may be employed.

If the switching mode is to be changed, the method 400 comprises determining 430 the time-shift for shifting the first upper control signal 115 and the first lower control signal 125. The time-shift may be determined based on e.g. the dead time constraint td, the minimum pulse-width tm and/or a wanted power to the load 10.

The method 400 further comprises providing 440 the first upper control signal 115 shifted by the time-shift 117 to the first upper switch 110 and the first lower control signal 125 shifted by the time-shift 117 to the first lower switch 120 at the second PWM period T2.

In some embodiments, the method 400 further comprises reverting to center aligned PWM-signals at a third PWM period T3 following the second PWM period T2. That is to say, the method 400 may comprise providing 450 the first upper control signal 115 to the upper switch 110 and the first lower control signal 125 to the lower switch 120 as center aligned PWM-signals at a third PWM period T3 following directly after the second PWM period T2.

The method 400 may optionally comprise checking if constraints (e.g. the dead time constraint td, the minimum pulse-width tm and/or a wanted power to the load 10) are already fulfilled at the second PWM period T2. That is to say, if it is determined 430 that at least the dead-time constraint td will be fulfilled by providing center aligned PWM-signals to the upper switch 110 and the lower switch 120, the time-shift 117 may be set to zero.

In FIG. 10, a processor device 502 is shown. The processor device 502 may be configured to perform, or cause other devices or processors to perform, some or all features of the method 400 presented with reference to FIG. 9.

In FIG. 11A, an exemplary vehicle 600 is shown. The vehicle 600 comprises the processor device 502 according to any embodiment or example presented herein.

In FIG. 11B, another exemplary vehicle 600 is shown. The vehicle 600 comprises the computer system 500 according to any embodiment or example presented herein.

FIG. 12 shows a computer program product 700. The computer program product 700 comprises a non-transitory computer-readable storage medium 710 storing a computer program 720. The computer program 720 comprises instructions 725, e.g. a computer program, program instructions etc., that, when executed by a processor device 502, execute, or cause other devices to execute, the method 400 presented with reference to FIG. 9. In FIG. 12, the non-transitory computer-readable storage medium 710 is exemplified as a vintage 5.25" floppy disc, but may be embodied as any suitable non-transitory computer readable medium such as, but not limited to, hard disk drives (HDDs), solid-state drives (SSDs), optical discs (e.g., CD-ROM, DVD-ROM, CD-RW, DVD-RW), USB flash drives, magnetic tapes, memory cards, Read-Only Memories (ROM), network-attached storage (NAS), cloud storage etc.

Figure 13:
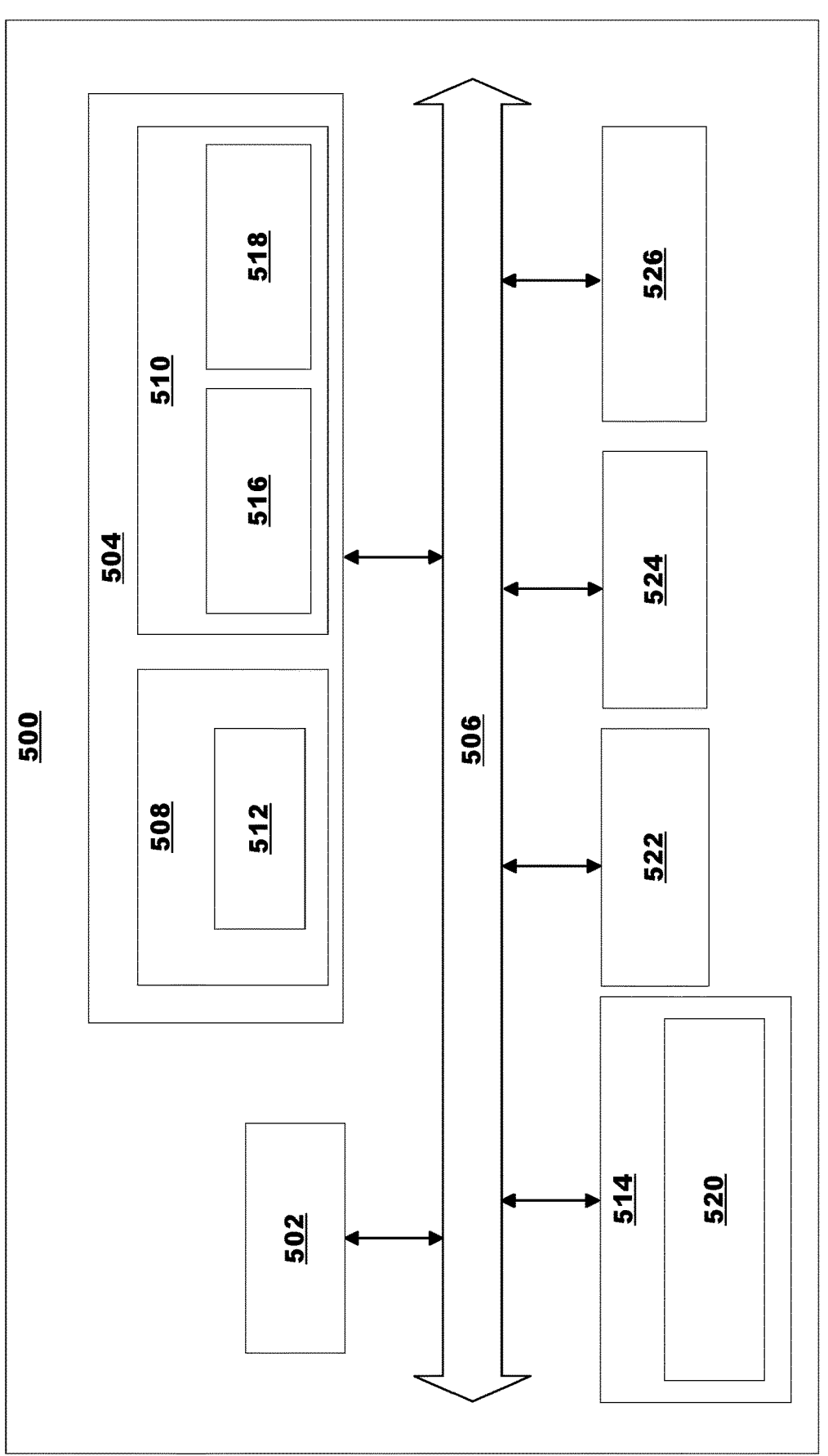
FIG. 13 is a schematic diagram of an exemplary computer system for implementing examples disclosed herein, according to one example.

FIG. 13 is a schematic diagram of a computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN, an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include a processor device 502 (may also be referred to as a control unit), a memory 504, and a system bus 506. The computer system 500 may include at least one computing device having the processor device 502. The system bus 506 provides an interface for system components including, but not limited to, the memory 504 and the processor device 502. The processor device 502 may include any number of hardware components for conducting data or signal processing or for executing computer code stored in memory 504. The processor device 502 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processor device 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with a processor device 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program product 520 stored on a transitory or non-transitory computer-usable or computer-readable storage medium (e.g., single medium or multiple media), such as the storage device 514, which includes complex programming instructions (e.g., complex computer-readable program code) to cause the processor device 502 to carry out the steps described herein. Thus, the computer-readable program code can comprise software instructions for implementing the functionality of the examples described herein when executed by the processor device 502. The processor device 502 may serve as a controller or control system for the computer system 500 that is to implement the functionality described herein.

The computer system 500 also may include an input device interface 522 (e.g., input device interface and/or output device interface). The input device interface 522 may be configured to receive input and selections to be communicated to the computer system 500 when executing instructions, such as from a keyboard, mouse, touch-sensitive surface, etc. Such input devices may be connected to the processor device 502 through the input device interface 522 coupled to the system bus 506 but can be connected through other interfaces such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may also include a communications interface 526 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer system comprising a processor device configured to switch between switching modes of a load, the switching modes being a complementary switching mode and a non-complementary switching mode of an upper switch and a lower switch of a first half-bridge converter configured to provide a wanted power to a load, the processor device is configured to:

provide a first upper control signal to the upper switch and a first lower control signal to the lower switch as center aligned PWM-signals at a first PWM period, responsive to determining that a current switching mode is to be changed at a second PWM period, the processor device is further configured to:

determine a time-shift for shifting the first upper control signal and the first lower control signal, and provide the first upper control signal shifted by the time-shift to the upper switch and the first lower control signal shifted by the time-shift to the lower switch at the second PWM period.

2. The computer system of claim 1, wherein the processor device is further configured to:

provide the first upper control signal to the upper switch and the first lower control signal to the lower switch as center aligned PWM-signals at a third PWM period following directly after the second PWM period.

3. The computer system of claim 1, wherein the switching mode of the first period is the non-complementary switching mode.

4. The computer system of claim 1, wherein the time-shift is determined based on a dead-time constraint of the first half-bridge converter.

5. The computer system of claim 1, wherein the time-shift is determined based on minimum pulse-width constraint of the first half-bridge converter.

6. The computer system of claim 1, wherein the time-shift is determined based on the wanted power of the load.

7. The computer system of claim 1, wherein the processor device is further configured to determine the time shift by:

responsive to determining that a dead-time constraint and a minimum pulse—with constraint will be fulfilled by providing center aligned PWM-signals to the upper switch and the lower switch, setting the time-shift to zero.

8. The computer system of claim 1, wherein the load is an inductive load in the form of a three-phase motor, the first half-bridge converter is configured to provide power at a first phase of the three-phase motor and wherein the method is repeated for a second half-bridge converter being configured to provide power at a second phase of the three-phase motor and for a third half-bridge converter being configured to provide power at a third phase of the three-phase motor.

9. A computer-implemented method for switching between switching modes of a load, the switching modes being a complementary switching mode and a non-complementary switching mode of an upper switch and a lower switch of a first half-bridge converter configured to provide a wanted power to a load, the method comprising:

providing, by a processor device of a computer system, a first upper control signal to the first upper switch and a first lower control signal to the first lower switch as center aligned PWM-signals at a first PWM period, responsive to determining, by the processor device that a current switching mode is to be changed at a second PWM period:

determining, by the processor device a time-shift for shifting the first upper control signal and the first lower control switch, providing, by the processor device the first upper control signal shifted by the time-shift to the first upper switch and the first lower control signal shifted by the time-shift to the first lower switch at the second PWM period.

10. The computer-implemented method of claim 9, further comprising:

providing, by the processor device the first upper control signal to the upper switch and the first lower control signal to the lower switch as center aligned PWM-signals at a third PWM period following directly after the second PWM period.

11. The computer-implemented method of claim 9, wherein the switching mode of the first period is the non-complementary switching mode.

12. The computer-implemented method of claim 9, wherein the time-shift is determined based on a dead-time constraint of the first half-bridge converter.

13. The computer-implemented method of claim 9, wherein the time-shift is determined based on minimum pulse-width constraint of the first half-bridge converter.

14. The computer-implemented method of claim 9, wherein the time-shift is determined based on the wanted power of the load.

15. The computer-implemented method of claim 9, wherein, determining the time shift further comprises:

responsive to determining, by the processor device, that a dead-time constraint and a minimum pulse—with constraint will be fulfilled by providing center aligned PWM-signals to the upper switch and the lower switch, setting the time-shift to zero.

16. The computer-implemented method of claim 9, wherein the load is an inductive load.

17. The computer-implemented method of claim 16, wherein the load is a three-phase motor, the first half-bridge converter is configured to provide power at a first phase of the three-phase motor and wherein the method is repeated for a second half-bridge converter being configured to provide power at a second phase of the three-phase motor and for a third half-bridge converter being configured to provide power at a third phase of the three-phase motor.

18. A vehicle comprising the computer system according to claim 1.

19. A computer program product comprising program code for performing, when executed by the processor device, the method of claim 9.

20. A non-transitory computer-readable storage medium comprising instructions, which when executed by a processor device cause the processor device to perform the method of claim 9.

* * * * *